United States Patent [19]

Maglich et al.

[11] Patent Number: 4,788,024
[45] Date of Patent: Nov. 29, 1988

[54] APPARATUS AND METHOD FOR OBTAINING A SELF-COLLIDING BEAM OF CHARGED PARTICLES OPERATING ABOVE THE SPACE CHARGE LIMIT

[75] Inventors: Bogdan Maglich, New York, N.Y.; Stephen Menasian, Allentown, N.J.

[73] Assignee: Aneutronic Energy Labs, Inc., Princeton, N.J.

[21] Appl. No.: 833,128

[22] Filed: Feb. 24, 1986

[51] Int. Cl.$^4$ .................................................. G21B 1/02
[52] U.S. Cl. ...................................... 376/107; 376/144
[58] Field of Search ................... 315/111.61; 328/233; 376/107, 144

[56] References Cited

U.S. PATENT DOCUMENTS 3,386,883  6/1968  Farnsworth .................... 376/107

OTHER PUBLICATIONS

The International Symposium on the Feasibility of Aneutronic Power: Flute Interchange M=1 Mode in Migma, Institute for Advanced Study, Princeton, N.J., Sep. 1987.
Roberts et al., Ultrahigh Vacuum and Its Application, Prentice-Hall, Inc. (1963).
Thomsen, Science News, vol. 103, No. 24, Jun. 16, 1973, pp. 392–393.
Bulletin of the American Physical Society, Program of the 29th Annual Meeting of the Division of Plasma Physics: Nov. 2–6, 1987, San Diego, CA, pp. 1849 and 1850, 6f: "Mostly Migma."
Ferrer et al., Observations of Highly Localized Trapping of MeVDeuterons Into Self-Colliding Orbit Distribution ("MIGMA") and Measurement of Its Density and Confinement Time, Nuclear Instruments and Methods, 157 (1978) 269–277.
Nuclear Instruments and Methods 120 (1974) 309–319.
Applied Physics Letters, vol. 26, No. 11, Jun. 1, 1975.
Nuclear Instruments and Methods 157 (1978) 269–277.
IEEE Transactions on Nuclear Science, vol. NS-22, No. 3, Jun. 1975.
Proc. 6th Internl. Vacuum Congr. 1974, Japan, J. Appl. Phys. Suppl. 2, Pt. 1, 1974.

*Primary Examiner*—Charles T. Jordan
*Assistant Examiner*—Richard W. Wendtland
*Attorney, Agent, or Firm*—Richard C. Woodbridge

[57] ABSTRACT

A self-colliding particle beam apparatus is capable of increasing stored ion density by a factor 10 and increasing ion confinement time by a factor of 10 to thereby increase the collisional energy between particles. The self-collider comprises essentially a superconducting magnet, an ultra-high vacuum system and an electrostatic stabilizer. The self-collider apparatus can be employed as part of a beam energy multiplier by combining it with an injector, including an ion source, an accelerator and a beam transport system. By increasing the stored ion density by a factor of 10 and by increasing the ion confinement time by a factor of 10, the increase in collisional probability between two particles increases by a factor of 1,000; this is due to the fact that the number of collisions is proportional to (density)$^2$ × (confinement time) and therefore $10^2 \times 10$ equals 1,000. If the masses of the particles in the beam are all the same, then the energy increase is up to a factor of 4 as calculated by the formula $(1 + M_1/M_2)^2$.

3 Claims, 7 Drawing Sheets

APPARATUS AND METHOD FOR OBTAINING A SELF-COLLIDING BEAM OF CHARGED PARTICLES OPERATING ABOVE THE SPACE CHARGE LIMIT

BACKGROUND OF THE INVENTION

1. Field of the Invention

The invention relates to a method and apparatus for increasing the collisional energy between particles in a self-colliding beam.

2. Description of the Prior Art

The collisional energy, also known as "center-of-mass" energy, of two bodies of equal mass, colliding head-on, is 4 times greater than the collisional energy obtained in the collision of a single living body with a body of equal mass at rest. This follows from the fact that relative velocity of two particles colliding head-on is 2 v, so the energy of two collision is $(\frac{1}{2}) m (2 v)^2 = 2 mv^2$, as opposed to $(\frac{1}{2})mv^2$ for a moving particle of velocity v colliding with a stationary particle. The exact energy multiplication factor achievable depends on the masses of two colliding particles. It is equal to $(1+m_1/m_2)^2$, where $m_1$ is the beam particle and $m^2$ the target particle. In the uncommon cases where the beam particle is heavier than the target particle, the multiplication factor can be much greater than 4, e.g. for $m_1/m_2 = 9$, it is 10,000.

The foregoing realization led to the invention of colliding beams by Wideroe (German Patent No. 876279 (1953). The major disadvantage of the Wideroe device was that the beams collided only once ('single traversal') which produced too small a number of nuclear reactions to be observable, let alone be practical.

In 1958 O'Neill proposed the concept of storage rings for two beams. This advance made the colliding beam concept practical, because it facilitated 'multiple traversal' of the same two beams, thus, the collision rate became more significant.

O'Neill and Richter reduced storage rings to practice in 1960 by making an operational storage ring for electron-electron collisions. A number of colliding beams with storage rings were built in the period 1960 to date, using electron-electron, proton-proton, electron-positron and proton-antiproton beams.

The number of collisions per particle stored in a storage ring is proportional to (particle density)$^2$ × (confinement time). Two well-known limitations to the number of collisions of ion storage rings are due to two different effects. The first limitation puts an "intrinsic" limit on the confinement time; the second, to the ion density. The limitations are:

(1) Blow-up of beams due to the beam-beam Coulomb scattering at non-relativistic energies.

This effect makes the use of colliding beams possible only for the high energy particles, i.e. the relativistic particles whose velocity approaches the velocity of light. For protons, it means an energy of 10,000 MeV, or higher. At the energies below 10,000 MeV, the multiple Coulomb scattering (MCS) at the intersection point disperses the particles; the cross sectional area of each beam becomes greater than that of the confining beam tube, the beam particles hit the walls of the vacuum chamber and the beam is destroyed. Since the probability that two colliding particles will undergo the MCS is much higher than that for undergoing nuclear reactions, the low energy beams blow up before any significant reaction takes place. For example, for 1 MeV proton-proton beams, the beam life time against MCS is typically one microsecond ($10^{-6}$ second). The probability for MCS is inversely proportional to the beam energy-squared; hence, only at very high energies will the beam blowup effect becomes negligible and the beam lifetime can reach many seconds.

(2) Blow-up due to electrostatic repulsion of the like charged particles within the beam itself.

This effects limits the density of the stored beam to the so-called "space charge limit." The latter is typically $10^8$ ions/cc at non-relativistic energies. Since the collision rate is proportional to beam density squared, the space charge limit presents a serious limitation to the collisional rate of the colliding beams and hence to its utility.

The concept of self-colliding orbits was invented in 1969, by Macek and Maglich [Particle Accelerators 1, 121 (1970)] and circumvents both of the beam blow-up problems because of the absence of rings and neutralization of the beam.

With regard to the absence of rings, the single volume magnetic mirror confinement device, generally called a 'self-collider', eliminates storage rings. Since most of the multiple scattering takes place in the center of the self-collider, absence of the storage rings means that MCS does not result in a blowup of the beams. The change of direction due to MCS in the center of the device will not eliminate the scattered particle from the device and the magnetic field will repeatedly return it back to the center.

With regard to neutralization, and in the 'self-collider', positive and negative particles are mixed, thus the stored particles are electrically neutralized which, in turn means absence of the repulsion and absence of the space charge limit. Specifically, in this context, the positively charged deuterium ions are mixed with electrons.

Colliding orbits without the storage rings, were first reduced to practice in 1973 by B. Maglich and co-workers [Nuclear Instruments and Methods 120, 309, (1974) and Applied Physics Letters 26, 609 (1975)]. In that embodiment, an accelerated beam of deuterons of 0.1 MeV was made to collide head-on with itself. Only in a single or multiple passage (5–10 passages) was this accomplished, however, and there was no neutralization of the stored, positively charged, deuterium ions by the ambient electrons. In 1976, Maglich and co-workers succeeded in making a multiturn injection into a self-collider with 1.2 MeV beam of molecular deuterons which resulted in a storage of 0.6 MeV atomic deuterium ions. The self colliding orbits were self-collided $10^7$ times per second, but electron trapping into the injected beam did not take place and consequently the density of the orbiting ions was limited by the space charge limit, $10^8$ ions per cc and the storage time to 2 seconds, both were insufficient to produce sufficient collisional rates and the practical reaction rates between the stored colliding ions [Ferrer, et al, Nuclear Instruments and Methods, 157, 269 (1978)].

Independently, a proton beam of 0.3 MeV imperfectly mixed with electrons was stored in 1965 in the DCX-1 machine at Oak Ridge National Laboratory, but the destructive plasma type instabilities made it impossible to exceed the space charge limit density of $2\times 10^8$ protons per cc. [H. Postma et al, Phys. Rev. Lett. 16, 265 (1966), and J. L. Dunlap et al, Phys. Fluids 9, 199, (1966).] It should be pointed out that the orbits in the DCX-1 machine were mostly concentric orbits rather than the "self-colliding orbits", i.e., the DCX orbits did not pass through the center of the device but, most of them circled the center. It was discovered by Maglich and co-workers that plasma instabilities were not present with the self-colliding (central) orbits at the ion densities of up to $3 \times 10^8$ ions per cc. [Ferrer et al, Nuclear Instruments and Methods, 157, 269 (1978)].

Summing up the prior art, the presence of space charge limits (failure to neutralize the ions) and that of plasma type instabilities (failure to stabilize) has prevented increases of ion densities above about $10^8$ ions per cc, and measurable practical nuclear collisional rates could not be achieved.

SUMMARY OF THE INVENTION

Briefly described, the invention comprises a method and apparatus to trap electrons and ions at a 10 times higher density than the space charge limit of prior art particle accelerators and storage rings and to produce a observable and copious energy multiplier effect. Collisional energies equal to 2 times the injection energy of the molecular beam (1.4 MeV) was achieved and nuclear reactions at that energy level (2.8 MeV) were recorded. If instead of the molecular beam, an atomic ion beam, had been injected, the factor would be in the neighborhood of 4.

The present invention is successful in solving the problem of overcoming the space charge limit and storing the ions densely and for a long time in order to achieve collision rates high enough to produce observable nuclear reactions at collisional energies 2 times greater than the injected ion energies, and 4 times greater than the stored ion energies. Specifically, the space charge limit was exceeded by a factor of 10, (from $3 \times 10^8$ d/cc (deuterium ions per cubic centimeters) to $3 \times 10^9$ d/cc), the ion confinement time increased by a factor of 10, (from 2 seconds to over 20 seconds); a collisional energy of 2.8 MeV was reached while the energy of the stored atomic ions was 0.7 MeV, and the energy of the injected molecular ion beam was 1.4 MeV, The invention comprises three components: (1) a superconducting magnet, (2) an ultra-high vacuum system, and (3) an electrostatic stabilizer.

The density increase, the confinement time increase and the beam energy multiplier action was achieved by the addition of (2) and (3) to the Prior Art which represent two major improvements in the embodiment of the self-collider. The ultra-high vacuum system improved the vacuum in the self-collider by a factor of 100, from $10^{-7}$ torr (high vacuum) to $10^{-9}$ torr (ultra high vacuum) while the beam was being injected. The electrostatic stabilizer traps electrons and, in turn, neutralizes the positively charged ions. The same electrostatic grids, at the same time, remove the plasma type instabilities.

The foregoing invention will be more fully understood with reference to the following drawings which are a part of this disclosure.

DETAILED DESCRIPTION OF THE INVENTION

During the course of this description like numbers will be used to indicate like elements according to the different areas of the invention.

Figure 1A:
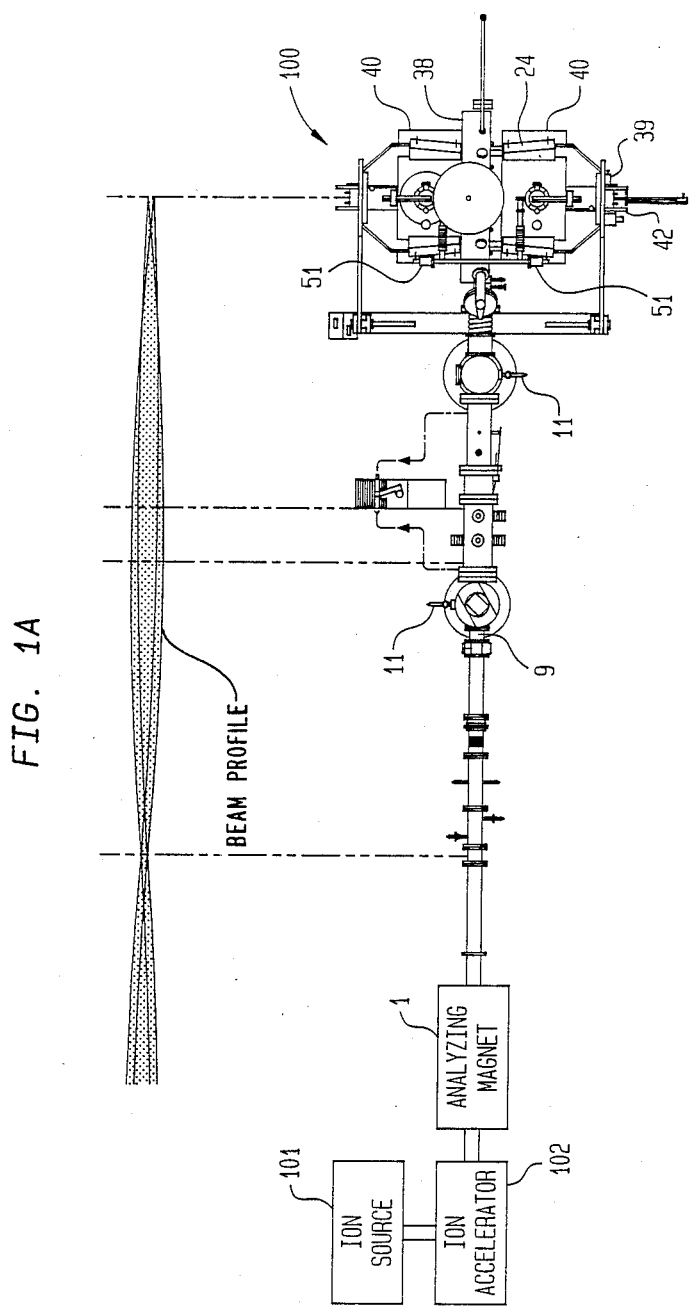
FIG. 1A is a top view of the self-collider/beam energy multiplier invention according to the preferred embodiment of the invention and its beam injection line assembly.
Figure 1B:
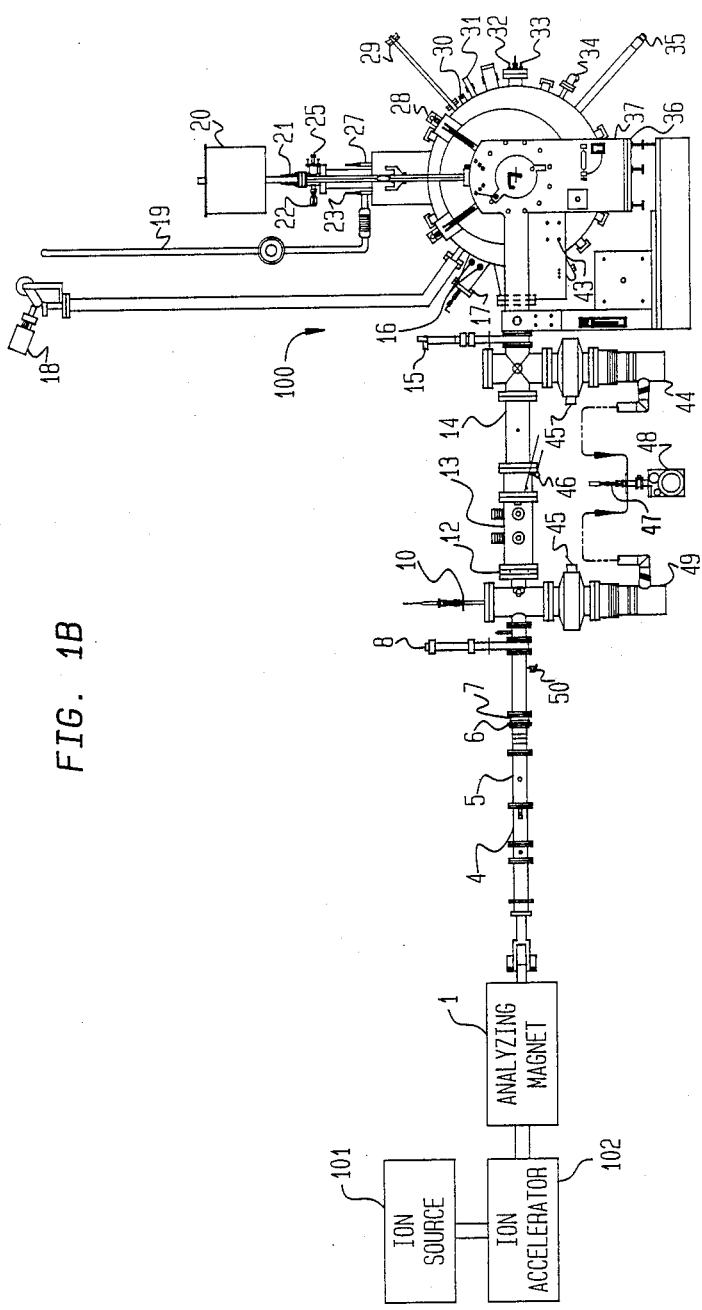
FIG. 1B is a vertical elevation of the self-collider/beam energy multiplier and its beam injection line assembly.
Figure 1C:
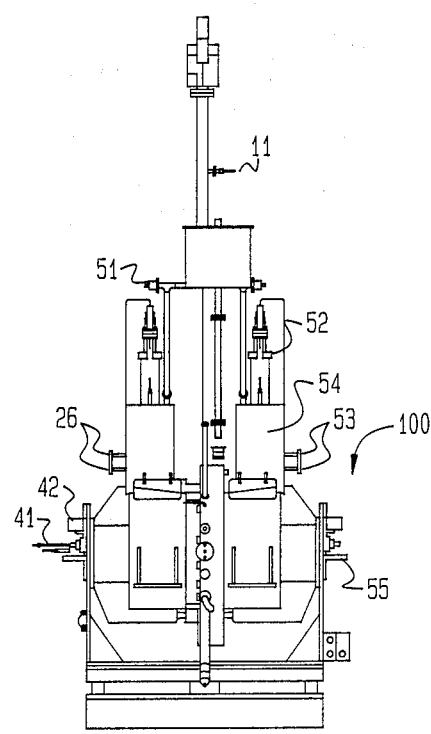
FIG. 1C is an end elevation of the self-collider/beam energy multiplier.

The elements referred to in FIGS. 1A–1C are set forth below:
1. Analyzing Magnet
2. (A E B) Gate Valve
3. $H_2O$ Slit Aperture
4. Slit Assembly
5. Beam Switcher
6. $H_2O$ Cooled Protective Aperture 25°
7. Ceramic Vacuum Break
8. Gate Valve L1
9. Freon Cooled Isolated Aperture 1"
10. Faraday Cup F1
11. Trigger Gauge
12. $H_2O$ Cooled Protective Aperture 10"
13. Elec. Quadruple Triplet Lens $0_2$
14. Electrostatic Beam Steerer
15. Chamber Gate Valve
16. Freon Cooled Aperture 205°
17. Faraday Cup 205°
18. Residual Gas Analyzer
19. Vacuum Jacket Pumping Manifold
20. $LN_2$ Chamber Reservoir
21. Superconducting Mag. Power Terminals
22. Cryostat Pressure Gauge
23. $LN_2$ Shield Fill
24. Cryostat Fill Tube
25. Cryostat Safety Blow Off
26. Supercon. Mag. Counterflow Leads
27. $LN_2$ Shield Vent 28. Support Pin Structure
29. Neutral Particle Detector
30. Vent and Roughing Valve
31. Viewing Part.
32. Freon Cooled Aperture 0°
33. Faraday Cup 0°
34. Titanium Sublimator
35. Radial Scraper
36. Supercon. Mag.+Chamber Support
37. Thermal Mechanical Leak
38. Migma Chamber
39. Controlled Leak Gas Bottle
40. Superconducting Magnet
41. Axial Probe
42. L He Tracer Tube Vent
43. Detector Amplifiers
44. Downstream Diff. Pump
45. LN$_2$ Trap
46. N$_2$ Purge
47. Foreline Thermocouple Gauge
48. Fore Pump
49. Upstream Diff. Pump
50. Roughing Valve
51. Pneumatic Valve
52. O Ring Heater
53. He Boil Off Flow Gauges
54. Expansion Joint Cryo-Tarus
55. Vacuum Jacket Thermocouple Gauge The preferred embodiment of the self-collider is connected to the output of a beam injection system (A) and comprises three functionally distinct parts, all of them in the same embodiment: (B) a superconducting magnet 40, (C) an ultra-high vacuum system; and (D), an electrostatic stabilizer.

A. THE BEAM INJECTION SYSTEM

The beam is injected into the energy multiplier 100 by means of an injector, which is comprised of an ion source 101, accelerator 102 and a beam transport system.

The injector injects a D.C. beam of $D_2^+$ (other molecular beams are also possible-such as $D_3^+$ or the atomic $^4He^+$ or any other type of atomic ion beam not fully ionized to facilitate trapping). The accelerator 102 is preferably a standard High Voltage Engineering Corporation model KN-3000. Beam energy stability of ±0.5% is maintained by a generating voltmeter feedback loop to the corona points. The beam spot size is about 2 mm in radius.

The beam is transported to the reaction chamber by way of an electrostatic and magnetic optical system. This includes initially a conventional electrostatic x-y steerer (not shown) placed before the beam enters analyzing magnet 1 at the base of the accelerator 102 followed by a conventional electrostatic quadrupole triplet Q1 (not shown). The beam next passes through analyzing magnet 1 and is deflected 25°; the beam then again passes through another electrostatic quadrupole triplet Q2(13) and then through a final steerer S2(14) and on into the reaction chamber 38. Due to the power in the beam and small spot size all the optical elements are protected by liquid cooled apertures and the entire length of the beam line as well as several critical areas on the reaction chamber 38 are monitored by heat sensors to protect against accidental burn through.

At various locations along the beam path Faraday cups (like cup 17) are installed to monitor beam current and to gain beam profile information. A Faraday cup $F_O$ (not shown) is inserted to intercept the full beam before the analyzing magnet 1 and thereby take the thermal load off $A_1(9)$ and decrease the gas load to this region of the system, but yet maintain switching speed. To reinject the beam the Faraday cup is withdrawn and the deflector then allows the beam to pass through $A_1$ after a 500 msec. delay, with a beam "turn on time" of 50 msec.

The injected $D_2^+$ beam had an energy of 1.445 MeV. Dissocation in the chamber gives rise to trapped $d^+$ ions with an energy equal to half the energy of the injected $D_2^+$ beam.

B. SUPERCONDUCTING MAGNET

The confining magnet field of the self-collider/energy multiplier is produced by a pair of superconducting coils (see FIG. 1) mounted in separate Dewars. The coils are constructed of approximately 8,000 turns of niobium titanium multi-filamentary wire in a copper matrix. This configuration produces a peak field on the conductor of 6 Tesla, a peak field along the z (coil) axis of 3.85 Tesla and a central field of 3.5 Tesla; the mirror ratio is approximately 1.024:1 over the confinement volume. The magnetic field is designed in such a way as to allow the chamber to have an inside "z" dimension of 7.5 cm. Each solenoid type coil has a center tap which allows shaping (namely in the form of making the field more uniform by reducing the central value) of the field to study and optimize ion orbit behavior. Self-colliding orbit radii are typically 5.5 cm and have a precession radius of about twice that. The coils operate at 4.2° K. in a boiling liquid helium bath powered externally through counterflow cooled leads. Typical operating currents are approximately 115 Amperes. The magnet and chamber are both mounted on a "gimballed" structure which allows spacial orientation to be easily changed and optimized.

The beam is injected at full field. Trapped ions are generated by injecting the $D_2^+$ (or $D_3^+$) beam through or near the "z axis" of the magnetic field. Those ions which become dissociated by Lorentz dissociation, beam gas interaction or beam migma or electron interactions, are trapped and form self-colliding orbits. The rf pickup (see electronic stabilizer description below) is capacitively coupled to the circulating ions and yields a signal which, when displayed on a spectrum analyzer, indicates the number of ions populating various orbits. This signal is optimized by controlling injected beam parameters, magnetic field and beam location.

C. THE ULTRA HIGH VACUUM SYSTEM

A ultra-high vacuum is maintained by a three-stage ultra-high vacuum pumping system which relies on oil diffusion pumps 44 and 49 (stages I and II) and titanium sublimation 34 (stage III). The first stage is a standard accelerator vacuum system which is nonbakeable and O-ring sealed. This is pumped by a liquid nitrogen trapped oil diffusion pump. The second stage begins at the analyzing magnet and, from this point on, the beamline is copper gasket sealed and bakeable to 400° C. An isolating orifice just after the analyzing magnet limits gas flow from the first stage to the second. The second stage is pumped by two liquid nitrogen trapped oil diffusion pumps 44 and 49. The vacuum in the first stage is typically a few $\times 10^{-7}$ Torr and in the second stage is generally a few $\times 10^{-9}$ Torr. The third stage consists primarily of the reaction chamber of self-collider. This is pumped by means of titanium sublimation 34. The periphery of the chamber consists of a liquid nitrogen cooled baffle onto which titanium is evaporated. The calculated pumping speed along the periphery is approximately 100,000 liters/sec. The chamber is conductance isolated from the beamline by the beam line itself and the normal dynamic vacuum of the chamber is a few $\times 10^{-9}$ Torr (principally $D_2$).

There is a significant gas load presented by the beam in the chamber itself. The best static vacuum obtained in the chamber is $5 \times 10^{-12}$ Torr after baking at 450° C. for 24 hours with no injected beam. This implies a contamination level on the order of $5 \times 10^{-12}$ Torr during operation (principally $H_2O$). All vacuum measurements are made with trigger discharge gauges and with an accuracy of about ±50%. Background gas analysis is monitored by a magnetic sector Residual Gas Analyzer located at the end of a long pipe connected to the chamber. It is located far away due to the large magnetic fields generated by the superconductor magnet 40 which may affect the RGA.

The reaction chamber 38 (see FIG. 2) is basically a stainless steel vacuum vessel sandwiched between two superconductive magnets 40 with various ports and feedthroughs for instrumentation. Two high powered liquid cooled Faraday cups are used as beam dumps (one 33 at 0° for field off position and one 17 at 205° for field on position). These contain either apertures, in the case of A0° (32), or slits, in the case of A205° (16) which give beam profile data. Along the "z" magnetic axis are two instrumentation ports (see FIG. 3). These contain three surface barrier detectors (56 A, B, Z) for nuclear reaction products monitoring and two RF pickup plates (57 A and B) for ion orbit and electron parameter monitoring. Along one radial port is mounted another solid state detector 58 (FIG. 2) which is highly collimated for charge exchange neutral particle detection. There are also three baffled titanium filament sublimation assemblies 34 (FIG. 2) mounted along radial ports which are periodically fired as needed to maintain the desired vacuum. The chamber 38 and beamline from the analyzing magnet to the chamber can be fitted with baking mantels (see FIG. 1). During the baking process the magnet must be separated and the chamber externally supported.

D. ELECTROSTATIC STABILIZER

The electrostatic stabilizer (see FIG. 3) consists of two circular molybdenum meshes (56 A and B), 7.3 cm in diameter each, with 3 mm square apertures and a transparency of 90%. Each mesh is installed on the transverse axis of the plane of the Migma, in the chamber, recessed by 0.5 cm from a chamber wall. Since the wall-to-wall separation along the Z axis is 7.5 cm, the two plates are 8.5 cm apart. The grids are necessary to allow for the passage of 90% of the charged particles protons and tritons, which are the products of nuclear reaction, through the grid and into the nuclear particle detectors placed behind the grids.

A negative DC voltage is placed at each plate. Its function is to contain the electrons in the space between the grids, which contains stored, self-colliding, positively charged ions (deuterons), and to make said electrons oscillate between the two grids and through the ions, thus neutralizing the assembly of the ions. In this manner, the space charge limit, which exists in all stored beams of (one sign of charge, is removed because both signs of charge are present in the same volume and the electric repulsion of the particles of one sign of charge is no longer operative.

Figure 4:
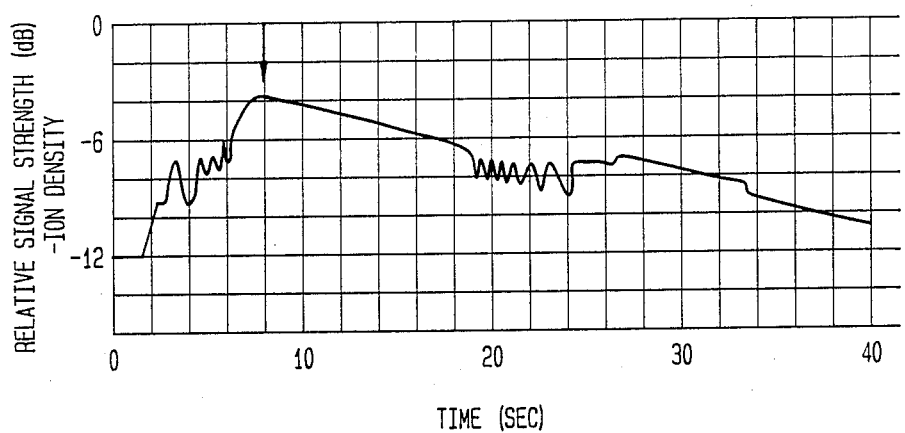
FIG. 4 illustrates the oscilloscope trace of the observed ion density versus time in the self-collider, using the electrostatic stabilizer. When the injection stops (A), the stored ion density begins to decay with a half-life time of over 20 seconds. Under the normal operating conditions of the energy multiplier, the beam injection continues beyond (A), thus the ion density level remains at the point A throughout the run.
Figure 5:
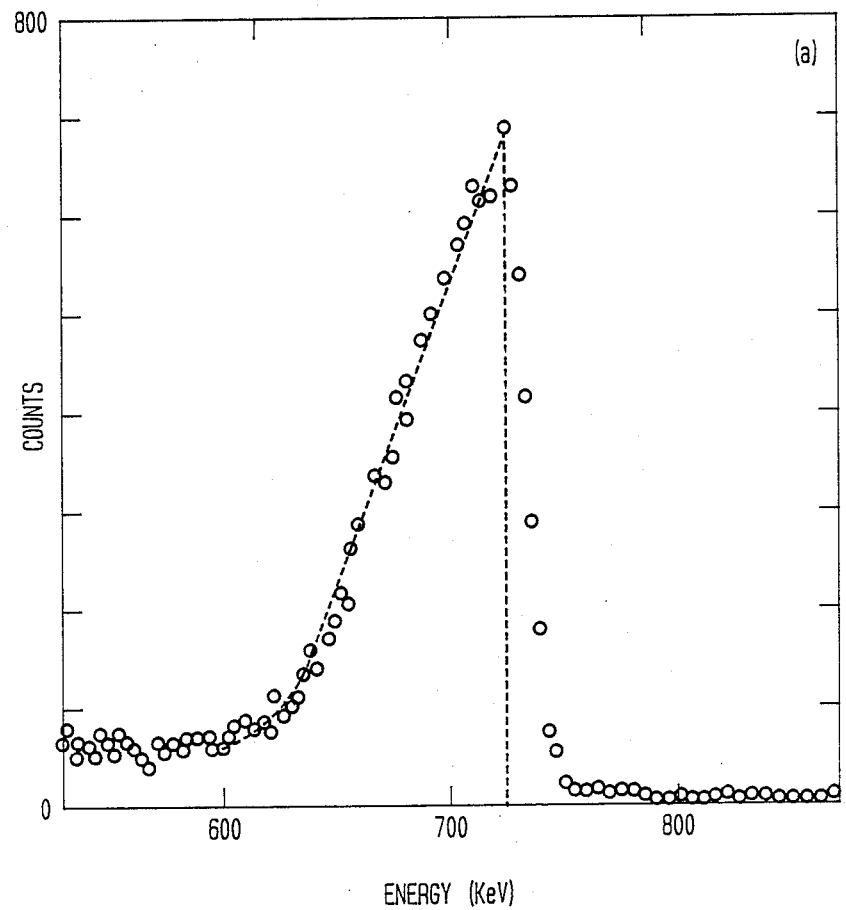
FIG. 5 is a graph of the observed number of stored deuterons as self-colliding orbits during 20 seconds versus energy of each deuteron. It indicates that most of the deuterons before undergoing nuclear reaction had an energy of between 0.700 and 0.725 MeV.

The stabilizer grids 56 A and B are also the rf pickup grids. Image currents induced on the plates by charged particle motions within the chamber are amplified by low noise amplifiers. The resultant signals contain information about the number of trapped ions, the distribution of ion orbits and the axial motion of electrons. With the zero voltage on the stabilizer 56 A and B, the density increases until $1.5 \times 10^8$ is reached, above this, intense burst of rf activity occurs and the self-colliding orbit distribution spreads away from the center. But, when about $-300$ to $-400$ volts is put on the stabilizer, the density increases by a factor of 20. FIG. 4 shows the growth and decay of density with $-300$ V on the stabilizer 56 A and B.

DENSITY BUILDUP BURSTING AND EXPONENTIATION

Several processes can contribute to trapping of deuterons. Gas dissociation is most important at high pressures. Under good vacuum conditions, other dissociation mechanisms become important such as Lorentz dissociation. Beam-migma collisional dissociation and beam-electron collisional dissociation are the fundamental mechanisms leading t exponentiation.

The "bursting" instability is capable of producing non-classical losses. It should be noted, however, that flute instabilities were not present under any experimental conditions.

There are two plausible explanations for the bursting: (1) overcoming the space charge limit given by equation 1 in Physical Review Letter paper Vol. 27, 14 (1971) or (2) resonant collective interactions between electrons and ion oscillations. This is expecially so when it is considered that instability responds to—and sometimes is suppressed by—externally applied "biases" of a few hundred volts. Ion numbers determined from the rf diagnostic, giving $n_v \approx 3.5 \times 10^9$ cm$^{-3}$ (plasma volume average) are consistent with those obtained from the observed migma-migma and migma-gas fusion rates. It is estimated that the 'midplane' 60 or 'central fast ion' density is $n_{cf} \approx 10^{10}$ cm$^{-3}$ (3×volume average). The peak density is of the order of ten times $n_v$; $n_c \approx 3 \times 10^{10}$.

Ion confinement time is determined from the rf diagnostic system. Observed lifetimes range up to 45 seconds. A typical ion storage lifetime at high density was 20 seconds. The ion decay is exponential over several orders of magnitude.

Figure 2:
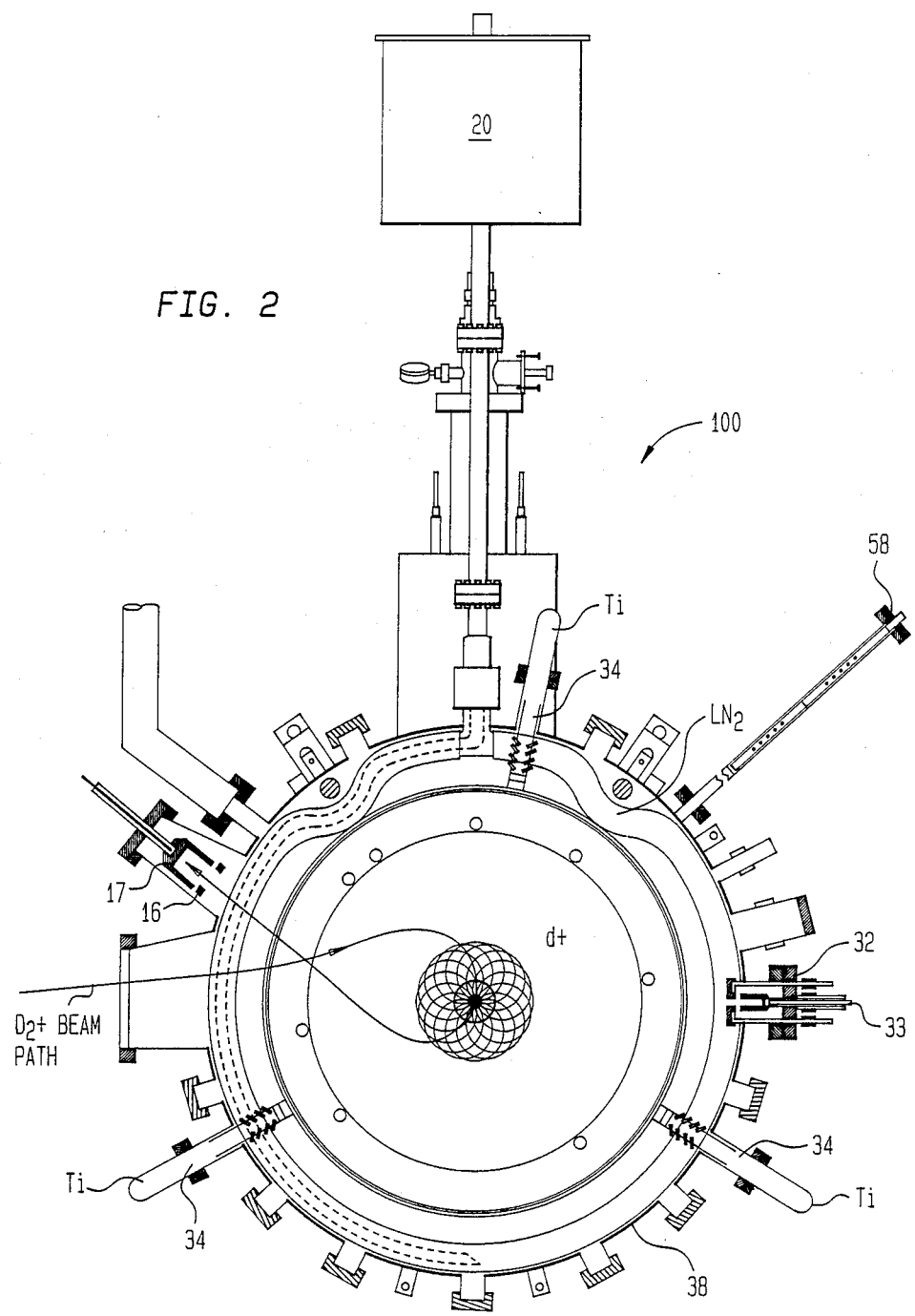
FIG. 2 is a cross-sectional view of the vacuum chamber of the self-collider.

Both, the energy of the stored deuterons and their energy loss rate is determined from the Charge Exchange Neutrals Detector 58 (CEND) (FIG. 2). It consists of a Si surface barrier detector which is mounted at the end of a collimating tube connected to one of the radial ports looking at the center of chamber 38 (FIG. 2). The distance between the detector 58 and the center of the chamber is about 141.5 cm. A schematic drawing of the CEND detector 58 is shown in FIG. 2. The location of the CEND detector 58 is such that the neutrals ($D^o$) produced by the dissociation of the injected $D_2^+$ beam will not be detected. However, a fraction of the confined ions in the central region of the chamber that are converted to neutrals ($D^o$) due the charge transfer process with the background gas or by electron capture will be detected by the CEND detector 58. The observed deuteron energy loss rate is 1.7 KeV per second, for a confinement time of 20 seconds.

The nuclear diagnostic (see FIG. 3) system consists of silicon surface barrier detectors (56 A, B, Z) and associated electronics, positioned to detect charged fusion products in coincidence.

Figure 3:
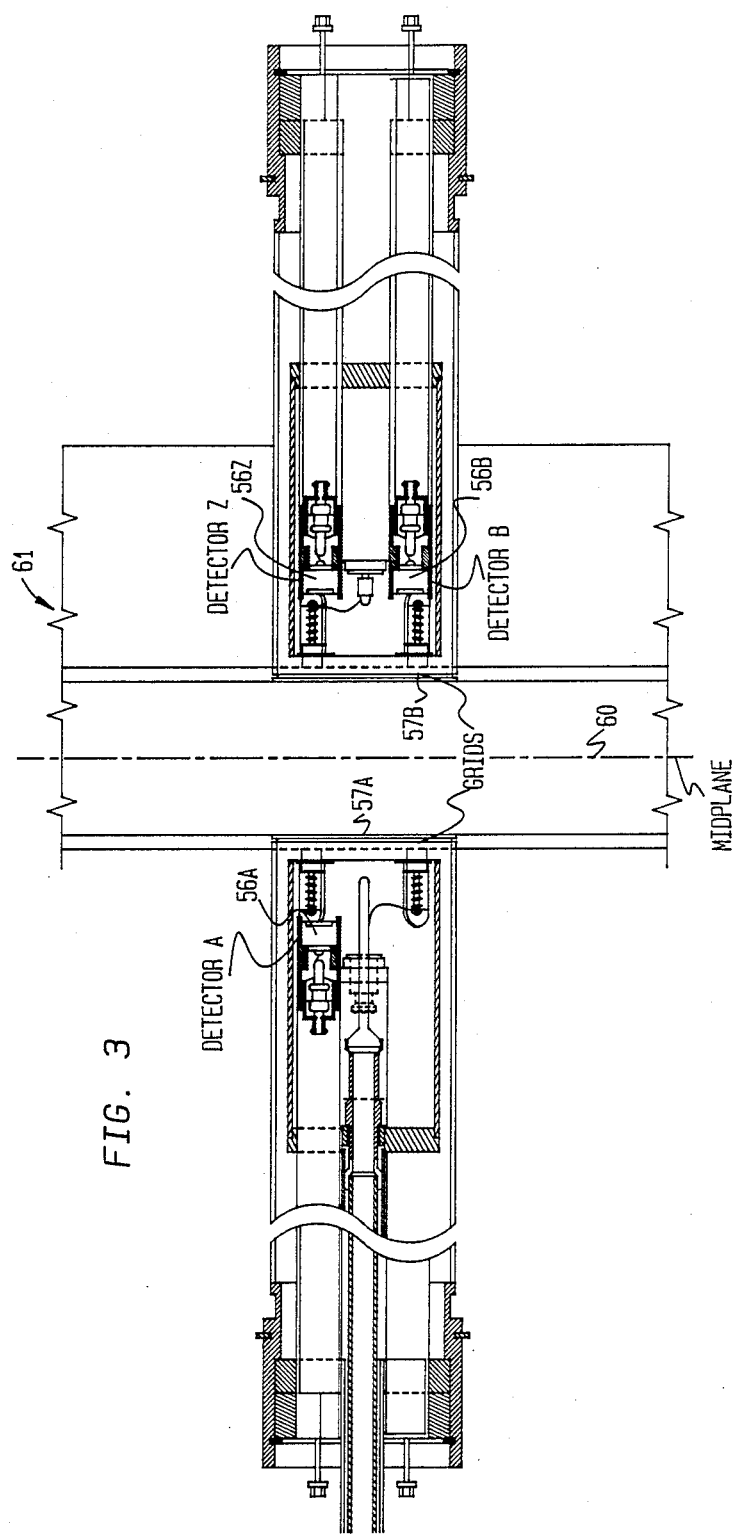
FIG. 3 is a cross-sectional view of the center region of the self-collider chamber showing the electrostatic stabilizer grids and the nuclear particle detectors to measure the energy of the reaction products.

Three Si surface barrier detectors with an effective surface area of 25 mm$^2$ each and depletion depth of around 300 m are used. A schematic drawing of detector A(56,A), B(56,B) and Z(56,Z) in position in the Migma IV chamber are shown in FIG. 3.

The nuclear detection system differs from the Migma III system in that the A detector (56 A) has been collimated so that it views only particles originating from the central region of the chamber (1 cm diameter at the midplane) 60. In addition, constant fraction discrimination has been incorporated into the timing system, reducing walk and jitter to 200 ps from the 5 ns observed with the Migma III system. No true coincidences were observed, however, with or without the constant fraction discriminator.

Figure 6:
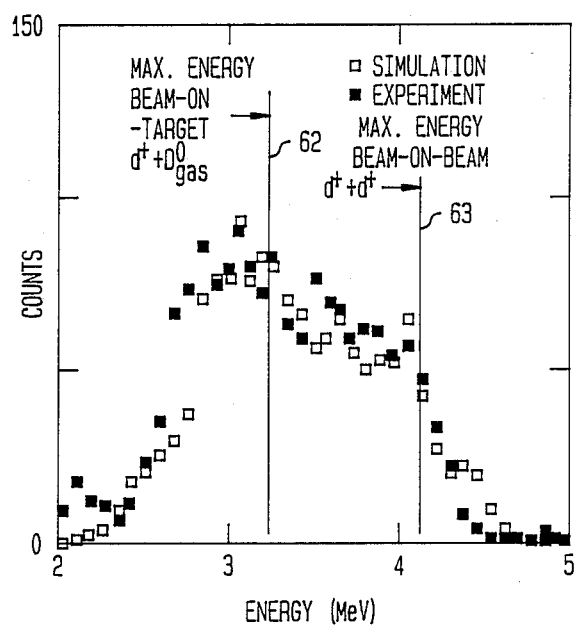
FIG. 6 is a graph of the observed number of protons produced in the nuclear reaction $d+d \rightarrow T+p+4$ MeV in a self-collider versus the measured proton energy. This graph, together with the graph in FIG. 5, demonstrates that the self-collider increases the collisional energy by a factor of 4 from the energy of the stored deuterons (energy 0.725 MeV) or by a factor of 2 from the energy of the injected molecular deuterium beam (energy 1.45 MeV).

Individual spectra observed during several runs are added together. The proton spectra of detectors A, B and Z are shown in FIG. 6 for an injected D$_2$+ energy of 1.450 McV.

The stored deuterium nuclei of up to 0.725 MeV in energy collide with both the deuterium nucleus at rest, contained in the D$_2^o$ gas in the chambers, and with the other stored moving d+. In the first case (beam-on-target), the maximum energy a proton can have is ($\frac{3}{4}$)(4+($\frac{1}{2}$)0.725) MeV = 3.2718 MeV. In the second case (beam-on-beam), the maximum proton energy is ($\frac{3}{4}$)(4+2×0.725) MeV = 4.0875 MeV. Peaks at these two energies were observed. When the 'basis' proton energy, ($\frac{3}{4}$)×4 MeV = 3 MeV is subtracted from both values, this gives the collisional energies of 0.2718 MeV (beam-on-target) and 1.0875 MeV (beam-on-beam) and their ratio which is exactly 4.

In general, the invention can operate successfully within the following ranges. The vacuum produced by the vacuum system should be at least $10^{-8}$ Torr and preferably $10^{-9}$ Torr. The super magnetic field strength (B) can be between 3 and 6 Tesla. The ion density is in the range of $1 \times 10^9$ to $3 \times 10^9$ ions per cc and preferably about $3 \times 10^9$ ions per cc. Containment time can be 20 to 45 seconds and preferably in the neighborhood of 25 seconds.

While the invention has been described with reference to a preferred embodiment it will be appreciated by those of ordinary skill in the art that various changes can be made in the parts and steps of the apparatus and method without departing from the spirit and scope of the invention.

We claim:

1. An apparatus for increasing the density of a self-colliding charged particle beam comprising:
   (a) superconducting magnet means for containing a beam of charged particles in self-colliding paths, said superconducting magnet means producing a magnetic field strength in the range of three (3) Tesla to six (6) Tesla for confinement of said beam of charged particles in the self-colliding paths;
   (b) vacuum means for producing a vacuum of a magnitude less than $10^{-8}$ torr in a zone where said superconducting magnet means contains said beam of charged particles, wherein said vacuum is produced by a vacuum pumpig means having a pumping capacity along the periphery of said zone of about 100,000 liters per second;
   (c) electrostatic stabilizing means positioned transverse to a magnetic field produced by said superconducting magnet means for neutralizing and stabilizing said beam of charged particles, wherein said electrostatic stabilizing means comprises radio frequency pick-up means coupled to a ratio frequency analyzing mean, and wherein said electrostatic stabilizing means further comprises at least one pair of the electrostatic grids,
   wherein said apparatus provides a stored ion density of approximately $3 \times 10^9$ ions per cubic centimeter and a confinement time of approximately 25 seconds.

2. A method for obtaining a self-colliding beam of charged particles operating above the space charge limit, comprising the following steps:
   (a) reducing the pressure within a vacuum zone means to a pressure less than $10^{-8}$ torr;
   (b) injecting a beam of charged particles within a magnetic field inside said vacuum zone means;
   (c) dissociating said beam of charged particles;
   (d) containing said dissociated beam of charged particles in a magnetic field formed by a superconducting magnet means having a mirror ratio greater than 1, so that said dissociated beam of charged particles is trapped within said magnetic field in self-colliding orbits;
   (e) neutralizing said dissociated beam of charged particles within an electrostatic stabilizing means comprising at least one pair of electrostatic grids placed perpendicular to said magnetic field with negative potential applied to each grid; and,
   (f) stabilizing said neutralized, dissociated self colliding beam of charged particles with said electrostatic stabilizing means, so that the stored charged particle density and the charged particle confinement time is increased above the space charge limit, which further increases the number of collisions between the charged particles in the self-colliding beam of charged particles.

3. The method of claim 2, further comprising the steps of:
   (a) detecting image currents induced on said electrostatic grids by the motion of said dissociated beam of charged particles and from electrons confined between said electrostatic grids; and,
   (b) adjusting the negative potential applied to said electrostatic grid to a value up to −400 volts,
   whereby said image currents detected from said electrostatic grids contain information, including the number of trapped ions, the distribution of ion orbits and the axial motion of electrons for stabilizing said dissociated beam of charged particles.

* * * * *